United States Patent [19]
Ehrich

[11] 3,843,277
[45] Oct. 22, 1974

[54] SOUND ATTENUATING INLET DUCT

[75] Inventor: Fredric Franklin Ehrich, Marblehead, Mass.

[73] Assignee: General Electric Company, Lynn, Mass.

[22] Filed: Feb. 14, 1973

[21] Appl. No.: 332,436

[52] U.S. Cl............. 415/119, 181/33 HA, 137/15.1
[51] Int. Cl...... E04f 15/20, F04h 29/66, F01n 1/02
[58] Field of Search................... 415/119; 60/39.29; 137/15.1; 181/33 HA, 47 B, 35; 244/53 B; 138/45

[56] References Cited
UNITED STATES PATENTS

| | | | |
|---|---|---|---|
| 2,882,881 | 4/1959 | Nedley | 181/35 R |
| 2,971,329 | 2/1961 | Barry | 60/39.29 |
| 3,163,379 | 12/1964 | McLafferty | 244/53 B |
| 3,295,555 | 1/1967 | James et al. | 138/45 |
| 3,444,872 | 5/1969 | Gabbay | 137/15.1 |
| 3,471,080 | 10/1969 | Gray | 415/119 |
| 3,611,724 | 10/1971 | Kutney | 415/119 |
| 3,616,808 | 11/1971 | Barche | 137/15.1 |
| 3,618,699 | 11/1971 | Evans | 415/119 |
| 3,659,418 | 5/1972 | Poucher et al. | 137/15.1 |

FOREIGN PATENTS OR APPLICATIONS

| | | | |
|---|---|---|---|
| 1,100,474 | 2/1961 | Germany | 244/53 B |

*Primary Examiner*—Henry F. Raduazo

[57] ABSTRACT

A sound attenuating inlet duct is provided for a gas turbine engine wherein the inlet duct includes a casing which defines an extended length, minimum cross-sectional throat area through which the inlet airflow is accelerated to a velocity less than the speed of sound to provide the equivalent sound attenuation of a conventional sound attenuating inlet duct which accelerates the inlet air flow to or above the speed of sound in a plane perpendicular to the inlet duct center axis.

4 Claims, 10 Drawing Figures

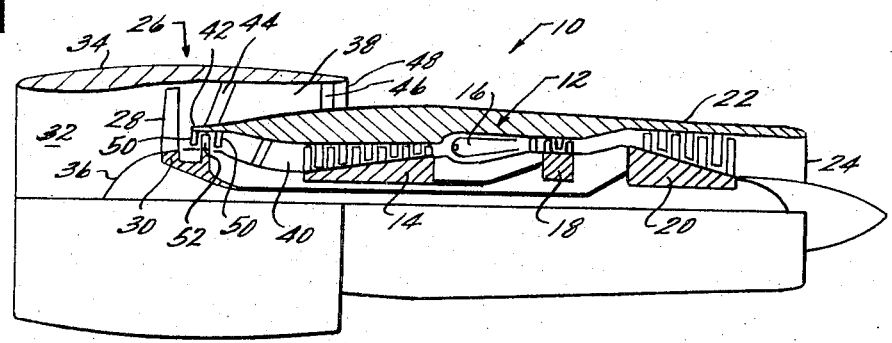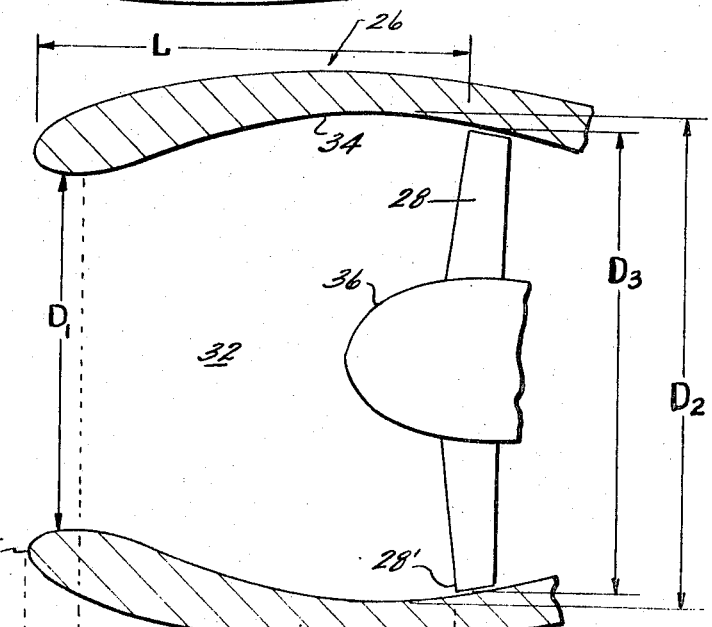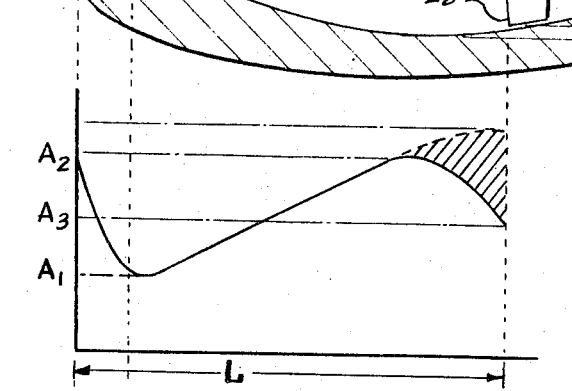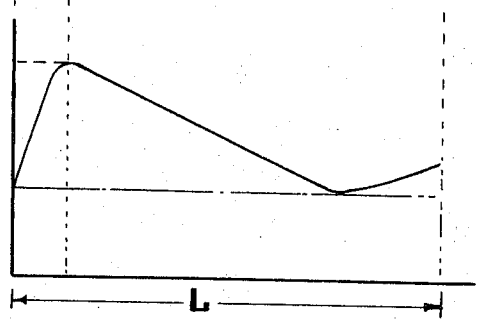

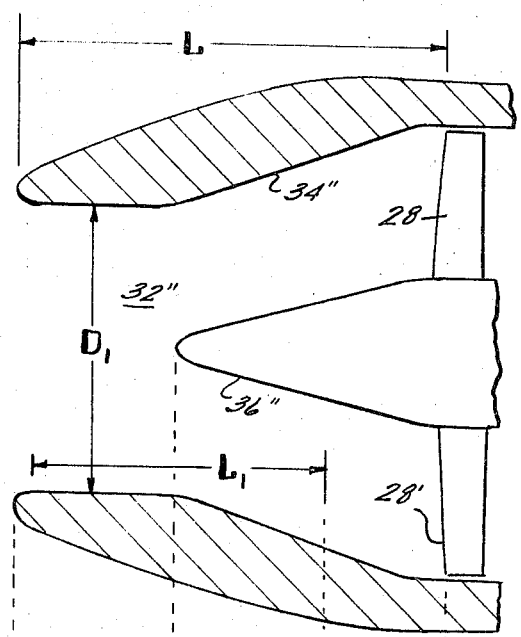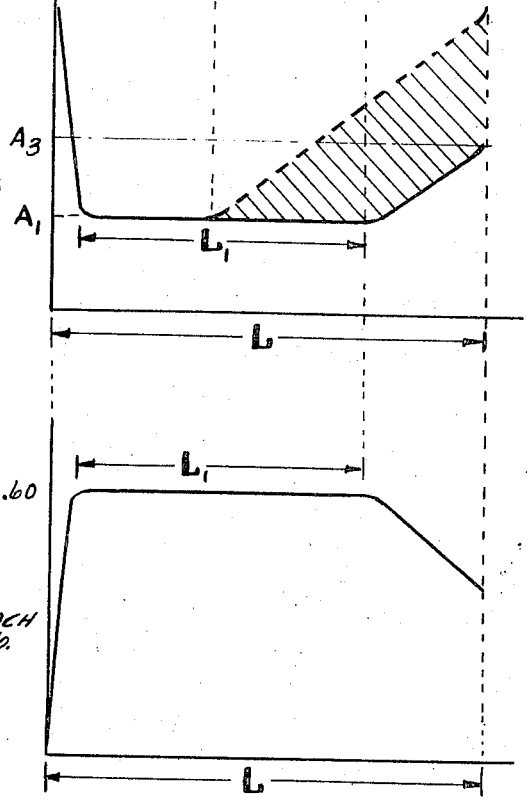

SOUND ATTENUATING INLET DUCT

BACKGROUND OF THE INVENTION

In general this invention relates to a sound attenuating inlet duct and, more particularly, to a sound attenuating inlet duct for a gas turbine engine wherein the inlet airflow is maintained at a velocity less than the speed of sound (subchoked) for an extended period in order to provide the equivalent sound attenuation of a conventional sound attenuating inlet which accelerates the inlet airflow to the speed of sound.

In recent years the noise levels generated by gas turbine powered aircraft have presented a number of problems to both those people situated close enough to airports to be affected thereby, and also to gas turbine engine manufacturers who are faced with the problem of trying to eliminate the noise. The use of gas turbine power aircraft has become so commonplace that the Federal Government, through the Federal Aviation Agency, has begun to generate noise level standards which must be met by aircraft and gas turbine engine manufacturers before an aircraft powered by the gas turbine engine will be certified.

With the advent of new high bypass, large diameter fan engines, there has been a reduction in the overall noise levels generated by aircraft. The reduced noise levels of high bypass turbofan engines are partly attributable to the reduced jet velocities of the airflow pressurized by the fan. High bypass turbofan engines are needed to power the new family of wide body, large jet transport aircraft, and therefore a great amount of effort has been expended in an attempt to further reduce the noise levels associated with such high bypass, large diameter type fan engines. In spite of this vast amount of effort and achievement further improvements are necessary and desirable.

In the inlet duct of a conventional gas turbine engine, objectionable sounds travel in the direction opposite to the airflow and out of the duct. These sounds originate within the engine and are transmitted through the incoming air. If the velocity of the incoming air in the duct is increased to equal or exceed the velocity of sound at all incoming air conditions across a plane perpendicular to the inlet duct centerline at any one place along the length of the duct, this condition (choked flow) would operate as a sound barrier through which undesirable sound waves could not pass. Such a phenomenon has been shown to be quite effective with regular gas turbine engines.

Inlet ducts cannot be designed to provide a permanently choked inlet airflow at takeoff where engine related noise is most bothersome because there would be an insufficient inlet airflow at other modes of operation, such as during an accelerated climb to altitude. In order that the inlet area be sufficiently large to accommodate the required inlet airflow at all modes of operation, it has been proposed to utilize variable geometry means to temporarily choke the flow during takeoff and landing where suppression of engine related noise becomes critical. One such variable geometry scheme for selectively choking the inlet airflow is fully disclosed in the U.S. Pat. No. 3,611,724, assigned to the instant assignee, which provides an inflatable diaphragm at the inlet throat in order to vary the cross-sectional area at the throat as a function of the flight mode of operation. The addition of variable geometry to the engine inlet duct, however, provides for added weight and cost to the engine and unnecessarily complicates the engine and control system design.

Therefore, it is a primary object of this invention to provide a sound attenuating inlet duct for a gas turbine engine which provides the equivalent sound attenuation of a conventionally choked inlet duct, but without the use of variable geometry.

It is also an object of this invention to provide a sound attenuating inlet duct for a gas turbine engine which is of substantially the same size as a conventionally choked inlet duct, and still provides the equivalent sound attenuation of the conventionally choked inlet duct.

It is a further object of this invention to provide a sound attenuating inlet duct for a gas turbine engine which does not utilize variable geometry, yet provides for a sufficient inlet airflow at modes of operation other than takeoff, such as during an accelerated climb to altitude.

SUMMARY OF THE INVENTION

A sound attenuating inlet duct is provided for a conventional gas turbine engine of the type having compressor means, combustion means and turbine means in serial flow relation. The sound attenuating inlet duct includes an outer casing extending forward of the compressor means and open at opposing ends to accommodate an inlet airflow to the compressor means. The casing defines an extended length, minimum cross-sectional throat area through which the airflow remains subchoked to provide sound attenuation equivalent to a totally choked inlet duct. The casing may be generally circular in cross-section with the ratio of the extended length of the minimum cross-sectional throat area to the throat diameter remaining greater than 0.1.

DECRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view, partly in cross-section, of a conventional high bypass gas turbine engine to which the noise attenuating inlet duct of this invention may be applied.

FIG. 2 is a partial cross-sectional view of the inlet duct portion of the conventional gas turbine engine of FIG. 1.

FIG. 2A is a graphical representation of the variation in cross-sectional area of the duct along the longitudinal length of the inlet duct of FIG. 2.

FIG. 2B is a graphical representation of the variation in inlet airflow average Mach number along the longitudinal length of the inlet duct of FIG. 2.

FIG. 4 is a partial cross-sectional view of an alternate embodiment for the sound attenuating inlet duct of this invention.

FIG. 4A is a graphical representation of the variation in cross-sectional area of the duct along the longitudinal length of the inlet duct of FIG. 4.

FIG. 4B is a graphical representation of the variation in inlet airflow average Mach number along the longitudinal length of the inlet duct of FIG. 4.

DESCRIPTION OF THE PREFERRED EMBODIMENT

Figure 3:
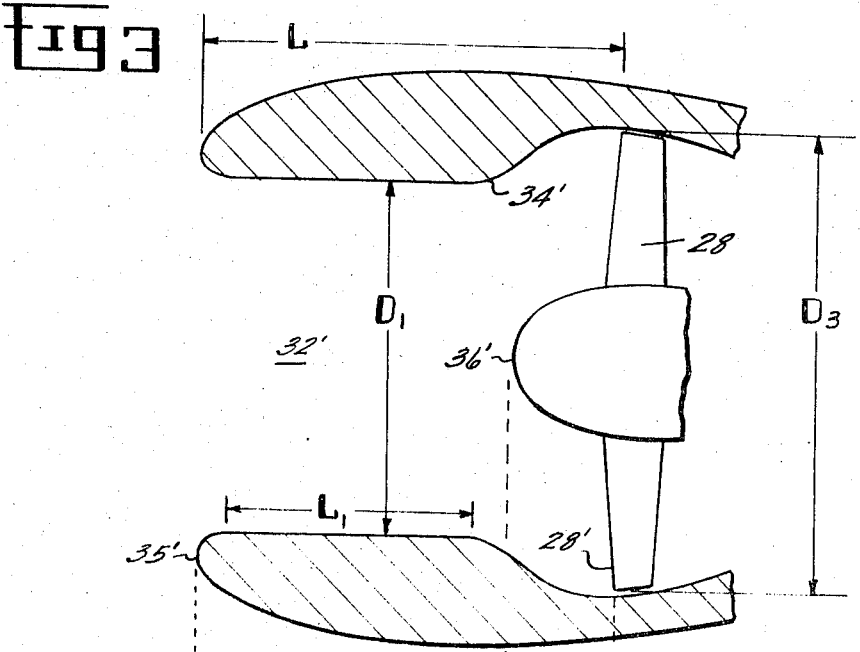
FIG. 3 is a partial cross-sectional view of the sound attenuating inlet duct of this invention.

Referring now to the FIGS. where like numerals correspond to like elements throughout. FIG. 1 shows in simplified fashion a conventional gas turbine engine 10 of the high bypass type comprising a core engine 12 which is essentially a turboshaft engine in that it includes a compressor 14, a combustor 16, a gas generator turbine 18 for driving the compressor 14, and a power turbine 20 arranged in axially spaced serial flow relationship. The inner turbo machine, or core engine 12, is enclosed within a cylindrical casing 22, which terminates at its downstream end in an exhaust nozzle 24 through which the combustion products may be discharged to produce thrust. In order to provide additional thrust, a fan 26 is mounted upstream of the core engine 12 and is driven by the power turbine 20. The fan 26 is comprised of a plurality of fan blades 28 which extend radially outward from a fan wheel 30, which is coupled for rotation to the power turbine 20. The fan blades 28 extend radially across an inlet duct or passageway 32 defined between an outer cylindrical casing 34 and a bullet nose centerbody 36 located upstream of the fan blade 28. The centerbody 36 may be either a rotating element formed integral with the rotor such as a spinner or it may be a fixed piece in relation to the engine frame, supported by struts (not shown) from the casing 34.

Downstream of the fan blades 28, the passageway is split into two passages 38 and 40 by a splitter platform 42. Radially positioned between the casing 34 and the splitter platform 42 are a plurality of fan stator vanes 44, which are followed by a plurality of outlet guide vanes 46. Thus a portion of the airflow entering the inlet passageway 32 flows through the fan blades 28, into the passageway 38, through the stator vanes 44, and through the outlet guide vanes 46, and thereafter exits through an outlet opening 48 formed by the casing 34 and the splitter platform 42. Since this air is pressurized in flowing through the fan blades 28, it provides forward thrust to the turbofan engine 10.

The remainder of the air flowing through the inlet passageway 32 and the fan blades 28 enters the passageway 40. Located within this passageway 40 are a plurality of inlet guide vanes 50 for the core engine 12, which are followed by a plurality of rotatable compressor blades 52, which are coupled for rotation with the fan blades 28.

The gas turbine engine 10 herein described is a high bypass ratio machine wherein the ratio of the mass flow of fluid in the bypass passageway 38 to the mass flow in the core engine 12 is high. Since a substantial amount of energy is extracted from the combustion gases in driving the power turbine 20, it will be apparent that the major portion of the total thrust provided by the gas turbine engine 10 is generated by the bypass stream of air emanating from the outlet 48. Although the noise attenuating inlet of this invention is hereinafter described in relation to a high bypass ratio machine, it is to be understood to have substantially broader application to other types of gas turbine engines including turboshaft and straight turbojet engines.

Referring now to FIG. 2, there is shown an enlarged view of the conventional fan 26 wherein the inlet passageway 32 initially converges to a minimum cross-sectional throat area having a diameter $D_1$, and then diverges outward toward a maximum cross-sectional area having a diameter $D_2$. The inlet passageway 32 thereafter converges toward the outer radial tips of the fan blades 28 so as to approach a diameter $D_3$ at the fan blade leading edges 28'. The axial length L of the inlet passageway 32 extends from the leading edge 35 of the outer casing 34 to the leading edges 28' of the fan blades 28.

Referring now to FIG. 2A, there is shown a graph representing the variation in cross-sectional area of the inlet passageway 32 as a function of axial length L. As is readily apparent, the cross-sectional area of the inlet passageway 32 decreases to a minimum area $A_1$ at the nozzle throat, after which the cross-sectional area increases to a maximum cross-sectional area $A_2$. The shaded portion of the graph represents the variation in cross-sectional area of the centerbody 36 and the rising phantom line represents the variation in cross-sectional area enveloped by the casing 34. The actual cross-sectional area of the inlet passageway 32 at any point along its center axis may be determined by subtracting the cross-sectional area of the centerbody 36 from the cross-sectional area enveloped by the casing 34 at that point. As is readily apparent from the solid line graph of FIG. 2A, the actual cross-sectional area of the inlet passageway 32 decreases to a cross-sectional area $A_3$ at the leading edges 28' of the fan blades 28.

Referring now to FIG. 2B, there is shown a graph representing the variation in inlet airflow average Mach number as a function of the axial length of the inlet passageway 32. As becomes readily apparent, the inlet airflow velocity is inversely proportionate to the cross-sectional area of the inlet passageway 32, and therefore reaches a peak average Mach number at the inlet throat.

One characteristic of every high bypass ratio engine is that the Diameter $D_3$ of the bypass fan is much larger than the diameter normally associated with a compressor or turbine section of the core engine. Because of this large diameter, the rotation of the fan 26 may result in an unacceptable noise level unless some provision is made for reducing the intensity of noise generated by such a fan. Conventional methods for reducing the noise levels associated with rotation of the large diameter fan of a high bypass ratio gas turbine engine have involved increasing the velocity of the air flowing through the inlet passageway 32 to a point wherein the velocity of the air is equal to or exceeds the velocity of sound (Mach 1) across a plane perpendicular to the center axis of the passageway 32. This condition is well known as choked flow and operates as an effective sound barrier through which undesirable sound waves generated by rotation of the fan 26 and interaction of the fan 26 and the stator vanes 44 are incapable of passing.

In the past, it has been found undesirable to design the inlet passageway 32 and the outer casing 34 for a permanently choked inlet airflow at takeoff where engine related noise is most bothersome because there would be insufficient inlet airflow at other modes of operation, such as during an accelerated climb to cruise altitude. Because it is not necessary to permanently choke the inlet airflow at all times, it has been proposed to utilize variable geometry means to temporarily choke the flow during takeoff and landing where the suppression of engine related noise becomes critical. As previously discussed, one such variable geometry scheme for selectively choking the inlet airflow is fully disclosed in U.S. Pat. No. 3,611,724 assigned to the instant assignee, and provides for an inflatable diaphragm at the inlet throat to vary the cross-sectional area at the throat as a function of the flight mode of operation. The addition of variable geometry to the engine inlet duct, however, provides for added weight and cost to the engine and unnecessarily complicates the engine design.

Referring now to FIG. 3, there is shown the sound attenuating inlet of this invention which neither utilizes variable geometry means nor totally chokes the inlet airflow. The applicant has discovered that a subchoked inlet airflow (airflow speed of less than Mach 1) over an extended length provides the equivalent sound attenuating characteristics of a totally choked inlet. The conventional gas turbine engine inlet, as shown in FIG. 2, has a readily defined minimum throat area which generally exists only in a single plane perpendicular to the center axis of the inlet passageway 32. The axially extending length of the minimum throat area is generally negligible in comparison to the throat diameter $D_1$. The sound attenuating inlet 32' of FIG. 3, however, has a minimum throat area extending an axial length $L_1$ and is not critically defined at one particular plane perpendicular to the inlet center axis. Because of the extended length $L_1$ of the minimum cross-sectional throat area, the inlet need not be totally choked but may be subchoked and still provide equivalent sound attenuation.

Figure 3A:
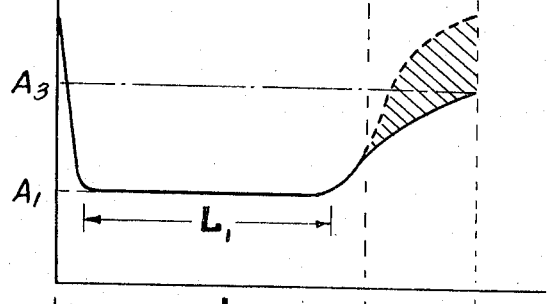
FIG. 3A is a graphical representation of the variation in cross-sectional area of the duct along the longitudinal length of the inlet duct of FIG. 3.

Referring to FIG. 3A, there is again shown the variation in cross-sectional area of the inlet passageway 32' as a function of the axial length of the passageway. The minimum nozzle throat area is $A_1$ and extends for an axial distance $L_1$ before gradually increasing to a maximum cross-sectional area $A_3$ at the leading edges 28' of the fan blades 28. The shaded area of the graph again represents the variation in cross-sectional area of the centerbody 36' which must be subtracted from the variation in area enveloped by the casing 34', as shown by the phantom line, in order to determine the actual variation in cross-sectional area of the inlet passageway 32' as shown by the solid line.

Referring now to FIG. 3B, there is again shown the variation in inlet airflow average Mach number as a function of the axial length of the inlet passageway 32'. Again, the inlet airflow average Mach number varies inversely to the variation in cross-sectional area of the inlet passageway 32'. It should be readily appreciated that the inlet airflow is not totally choked and therefore does not restrict the higher inlet airflow rates required during an accelerated climb to cruise altitude. It should also be appreciated that the average Mach number need not remain absolutely constant throughout the length $L_1$ of the throat as shown by the solid line in FIG. 3B, but may also vary along the extended length $L_1$ as shown by the phantom line. There may also be an accompanying slight variation (not shown) in the minimum nozzle throat area $A_1$ along its axial length $L_1$. The acceptable range within which the inlet airflow average Mach number may vary to produce equivalent sound attenuation through an extended length throat is in the order of 0.55 to 0.75. It has been further found that the length of the minimum nozzle throat area $L_1$ must be extended such that the ratio of the throat length $L_1$ to the throat diameter $D_1$ remains greater than 0.1. In order that the total length of the inlet passageway 32' not exceed the length of a conventional inlet, it will be appreciated that the cross-sectional area of the passageway 32' is designed to gradually increase only to the diameter $D_3$ at the leading edges 28' of the fan blades 28 and not to exceed the diameter $D_3$ as was described in relation to the conventional inlet of FIG. 2.

Referring now to FIG. 4, there is shown an alternate embodiment for the sound attenuating inlet of this invention. An extended length centerbody 36'' has been designed to cooperate with casing 34'' in order to maintain the extended length of the throat area. FIG. 4A shows the variation in cross-sectional area of the inlet passageway 32'' as a function of the axial length of the passageway. The shaded area of the graph again represents the variation in cross-sectional area of the centerbody 36'' which must be subtracted from the variation in area enveloped by the casing 34'', as shown by the phantom line, in order to determine the actual variation in cross-sectional area of the inlet passageway 32'' as shown by the solid line. As is readily apparent, the net effect of the nozzle of FIG. 4 is identical with that of FIG. 3. The minimum nozzle throat area $A_1$ of FIG. 4A is maintained for the same extended axial length $L_1$ as that of FIG. 3A.

Figure 3B:
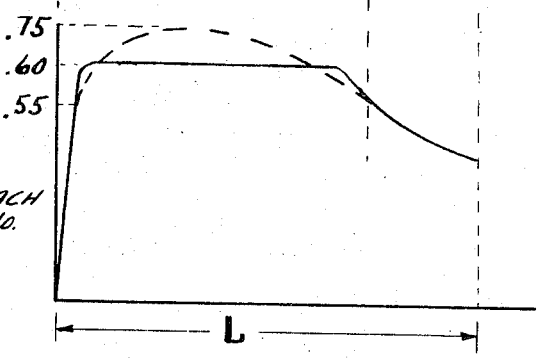
FIG. 3B is a graphical representation of the variation in inlet airflow average Mach number along the longitudinal length of the inlet duct of FIG. 3.

Referring to FIG. 4B, it can also be seen that the inlet airflow is maintained at a maximum average Mach number for the same extended axial length $L_1$ as that in FIG. 3B.

Therefore, having described preferred embodiments of the invention, though not exhaustive of all possible equivalents, what is desired to be secured by letters patent is claimed below.

What is claimed is:

1. In a gas turbine engine of the type having compressor means, combustion means, and turbine means in serial flow relation, there is provided a sound attenuating inlet duct comprising:
   an outer casing extending forward of the compressor means and open at opposing ends to accommodate an inlet airflow to the compressor means wherein the inlet cross-sectional area enveloped by the casing initially converges to a minimum cross-sectional throat area intermediate the ends thereof and thereafter diverges outward to an increased diameter at the interface with the compressor means, said throat area remaining substantially constant for an extended length through which the airflow is accelerated to a speed less than the speed of sound, thus remaining subchoked to provide sound attenuation equivalent to a totally choked inlet duct where the inlet airflow is accelerated to at least the speed of sound in a plane perpendicular to the inlet duct center axis.

2. The sound attenuating inlet duct of claim 1 wherein the outer casing is generally circular in cross-section and the ratio of the extended length of the minimum cross-sectional throat area to the throat diameter is greater than 0.1.

3. The sound attenuating inlet duct of claim 2 wherein there is further included a centerbody centrally disposed within the casing such that the effective cross-sectional area of the sound attenuating inlet is a function of the cross-sectional area enveloped by the casing minus the cross-sectional area of the centerbody.

4. The sound attenuating inlet duct of claim 2 wherein the inside surface of the casing diverges outward along a portion of the longitudinal length of the minimum cross-sectional throat area with the centerbody extending centrally into said portion such that the effective cross-sectional area of the sound attenuating inlet remains substantially constant throughout the extended length of the minimum cross-sectional throat area.

* * * * *